United States Patent [19]

Smith, Jr.

[11] 4,381,449
[45] Apr. 26, 1983

[54] NEUTRON-INELASTIC GAMMA RADIATION WELL LOGGING METHOD AND APPARATUS WITH BACKGROUND RADIATION ACCOUNTED FOR

[75] Inventor: Harry D. Smith, Jr., Houston, Tex.

[73] Assignee: Texaco Inc., White Plains, N.Y.

[21] Appl. No.: 536,700

[22] Filed: Dec. 26, 1974

Related U.S. Application Data

[60] Division of Ser. No. 448,091, Mar. 4, 1974, Pat. No. 3,946,226, which is a continuation of Ser. No. 322,573, Jan. 10, 1973, Pat. No. 3,796,877, which is a continuation of Ser. No. 145,815, May 21, 1971, abandoned.

[51] Int. Cl.³ .............................................. G01V 5/00
[52] U.S. Cl. .................................................. 250/270
[58] Field of Search ....................... 250/262, 269, 270

[56] References Cited

U.S. PATENT DOCUMENTS 3,833,809  9/1974  Biel ..................................... 250/262

*Primary Examiner*—Alfred E. Smith
*Assistant Examiner*—Janice A. Howell
*Attorney, Agent, or Firm*—Thomas H. Whaley; Carl G. Ries

[57] ABSTRACT

Methods and apparatus are provided for making improved pulsed neutron derived measurements of the carbon: oxygen ratio in subsurface earth formations. Plural radiation measurements are made as a function of time from the initiation of the neutron pulse to distinguish inelastic and thermal neutron interactions. These measurements are then combined in several different manners to provide an improved carbon:oxygen ratio measurement and multiple porosity and formation lithology indication measurements.

31 Claims, 5 Drawing Figures

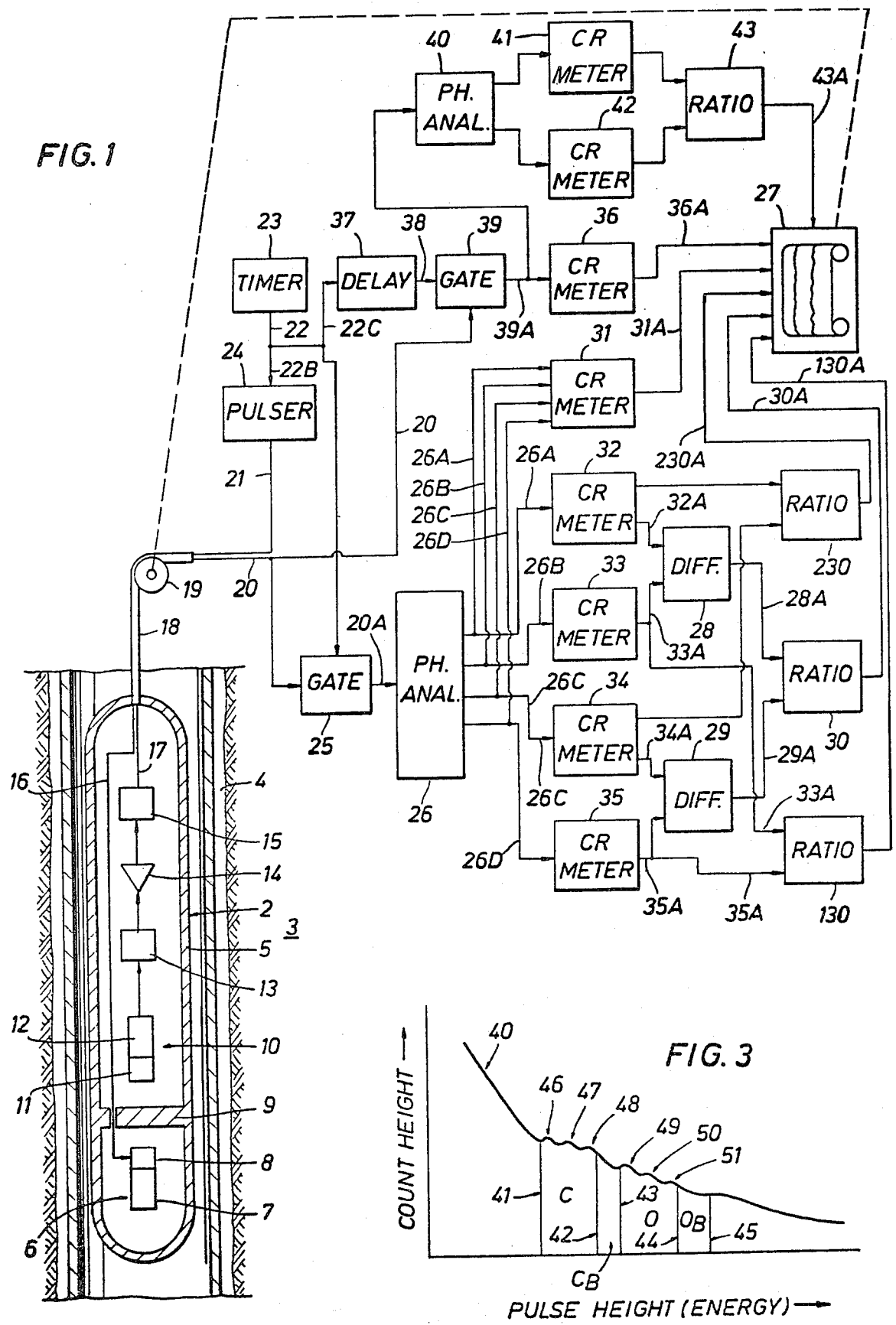

NEUTRON-INELASTIC GAMMA RADIATION WELL LOGGING METHOD AND APPARATUS WITH BACKGROUND RADIATION ACCOUNTED FOR

This application is a division of application Ser. No. 448,091, filed Mar. 4, 1974, now U.S. Pat. No. 3,946,226 which application was a continuation of application Ser. No. 322,573 filed Jan. 10, 1973, now U.S. Pat. No. 3,796,877 which application was a continuation of application Ser. No. 145,815 filed May 21, 1971, now abandoned.

BACKGROUND OF THE INVENTION

This invention relates to radiologicial well logging methods and apparatus for investigating the lithological characteristics of subsurface earth formations traversed by a borehole and, more particularly, relates to improved neutron-gamma ray logging methods and apparatus.

It is well known that oil and gas are more likely to be found in commercially recoverable quantities in those earth formations which are relatively porous and permeable than in the more highly consolidated formations. It is also well known that an oil or gas-filled strata may be located by passing a neutron source through the borehole and measuring the intensity of secondary gamma radiations which are produced at various depths in the borehole. A chlorine nucleus has a thermal neutron capture cross section which is much higher than that of nuclei of most of the other elements which are found in greatest abundance in the earth, and thus a salt water filled limestone or sandstone layer will have a greater macroscopic thermal neutron capture cross section than will an oil saturated layer. Accordingly, this difference can be observed by measuring either chlorine capture gamma rays or the lifetime of the thermal neutron population in the layer.

Although these logging techniques have long been used, and although a great many oil or gas-bearing formations have been found in this manner, they have also produced a great many spurious indications. This is because many porous earth formations contain low salinity water, which is indistinguishable from oil using these methods. Thus, the intensity of the capture gamma radiation which is detected at various borehole depths is an indication of fluid salinity and porosity, and is not necessarily conclusive evidence that an oil-bearing formation has been discovered. An inelastic gamma ray spectrum, however, is independent of salinity since chlorine has a small inelastic cross section.

The carbon nuclei in the oil will, to a limited extent, also engage in capture interactions with bombarding neutrons, although the thermal neutron capture cross section of carbon is extremely low, and this is also true for oxygen nuclei. However, the inelastic scattering reaction cross section is appreciable for both carbon and oxygen if the collision energy of the neutron is sufficiently high. Furthermore, the initial energies of the gamma rays resulting from carbon are distinctively different from that of gamma rays resulting from oxygen when this reaction occurs. Accordingly, it has long been assumed that a measurement of inelastic scattering gammas could provide the basis of a technique for detecting and identifying an oil or gas-bearing earth formation as opposed to a water-bearing formation as such.

Many attempts have been made to employ this concept in well logging. Thus far, however, none of the methods and apparatus which utilize this concept have been reliable.

One of the principal reasons for this lack of success is that carbon is one of the most common elements in the earth's crust. Moreover, a limestone formation is largely composed of calcium carbonate, and thus a water-bearing limestone formation will frequently emit more carbon gammas than will an oil-filled sand or shale.

Another problem is that a gamma ray tends to readily engage in scattering reactions itself and further tends to lose energy to some extent with each scattering. The initial energy of a gamma which results from the inelastic scattering of a neutron by an oxygen nucleus is only a little higher than the initial energy of a gamma resulting from inelastic scattering of a neutron by a carbon nucleus. Thus, many of the gammas which emanate from fast neutron bombardment of a water-bearing formation will frequently have declined in energy by the time they are actually detected, whereupon they may be mistaken for non-degraded gamma rays which have emanated from carbon nuclei.

Not all oxygen-emitted gamma rays will be degraded before they are detected, however, and thus it has been proposed to log a well with the detector signal being applied to a "two-window" analyzer. More particularly, one window is set to accept only pulses attributable to detected gammas having terminal energies which approximate the initial energies of oxygen-emitted gamma rays, and the other window is set to accept only pulses comparable to gammas with terminal energies corresponding to carbon-emitted gammas. Thus, the counting rates of the two windows may be compared to provide an indication of whether a particular formation contains oil or water.

Although such a log has been performed with some success, it nevertheless is often unreliable and has therefore never been universally accepted by the petroleum industry. A principal reason for its lack of reliability is, again, the fact that gamma rays tend to quickly lose energy, and this is especially true when the gamma radiation encounters a relatively dense medium. Thus, a high count rate for the lower of the two windows may actually be due to the fact that most of the oxygen-emitted gamma rays have become degraded before detection, by reason that the gammas were required to pass through the formation, the liquid-filled borehole, the sonde case, and possibly a cemented casing before they could reach the detector in the logging tool. Furthermore, most oil-bearing formations also contain at least an appreciable amount of water, and the oil/water interface is extremely difficult to detect merely by a qualitative measurement of the number of carbon-emitted gammas which manage to reach the detector.

Many attempts have been made to improve the foregoing technique. For example, the degrading effect of the drilling fluids in the borehole has been reduced by decentralizing the logging instrument in the borehole. Also, the size of the phosphor used in the detector has been increased substantially in order to sense a greater proportion of the gamma rays sought to be detected, whereby the measurement has been improved from a statistical standpoint. Although most if not all of these changes have been of some benefit, no change has been found which would make any log fully acceptable to the petroleum industry which is based principally on this concept.

These and other disadvantages of the prior art are overcome with the present invention, however, and novel well logging methods and apparatus are provided for simultaneously and correlatively measuring the gamma radiation resulting from the inelastic scattering of neutrons by carbon and oxygen nuclei as a function of the lithological characteristics of a subsurface earth formation.

SUMMARY OF INVENTION

In one embodiment of the present invention, a well logging tool is employed which contains a conventional source of fast neutrons and at least one gamma ray detector. Any neutron source capable of producing inelastic interactions with carbon and oxygen may be used for this purpose, such as an encapsulated mixture of radium and beryllium, plutonium and beryllium, or the like. All alpha-emitters such as radium or plutonium will also emit gamma rays in large numbers, however, and thus an especially suitable neutron source is the wellknown deuterium/tritium accelerator or the like since such a source can be operated to produce timed bursts of neutrons and other capabilities as will hereinafter be referred to in detail.

The detector which is most appropriate to the purposes of the present invention is one that provides an indication of the terminal energy of each detected gamma ray, whereby those gammas which originate from carbon or oxygen nuclei may be identified and distinguished from gamma radiation originating from other sources such as silicon nuclei or from the neutron source itself. Accordingly, an especially suitable detector is a conventional scintillation counter having a large thallium-activated crystal which is composed of sodium iodide or cesium iodide or the like.

The neutron source and detector are preferably spaced apart from each other within a fluid-tight instrument housing which is preferably urged continually against one side of the casing or borehole wall, whereby neutrons from the source may bombard the earth formation without having to first pass through the drilling fluid and other liquids which usually accumulate in the borehole or casing, and whereby the gamma rays emanating from the neutron-irradiated formation may travel to the detector without first having traveled through such liquid.

A conventional scintillation counter operates to provide an electrical pulse upon the occurrence of each gamma ray detected by the crystal and to provide each such pulse with an amplitude which is a function of the terminal energy of the gamma ray to which it corresponds. Thus, other conventional electrical circuitry may be included within the instrument housing for eliminating noise pulses and other spurious signals from the train of pulses generated by the detector and for suitably amplifying the genuine pulses, whereby they can be transmitted to the surface of the earth by way of the logging cable.

In addition to the various signal processing and recording equipment which is conventionally employed at the surface, a multichannel pulse height analyzer having four or more windows may be included for the purpose of separating the incoming detector pulses according to four preselected energy range. More particularly, two of the four windows will preferably be set to pass only those pulses which correspond to carbon and oxygen gammas, respectively, and the other two windows will preferably be set to pass those background pulses which have heretofore been accepted as carbon and oxygen gammas but which are actually primarily degraded gammas, capture gammas, gammas originating in the instrument housing, or gammas from other elements in the formation.

Accordingly, window No. 1 is preferably set to pass only pulses having amplitudes in the range of 3.0 Mev. to 4.7 Mev., window No. 2 to pass only pulses in the range of 4.7 Mev. to 5.0 Mev., window No. 3 to pass only pulses in the range of 5.0 Mev. to 6.5 Mev., and window No. 4 to pass only pulses in the range of 6.5 Mev. to 7.5 Mev. amplitude. The counting rate of the pulses from each of these windows may be determined by conventional circuitry and may be indicated by signals C, $C_B$, O, and $O_B$, respectively, whereby signals (C-$C_B$) and (O-$O_B$) will represent the carbon gamma and oxygen gamma counting rate, respectively, and whereby signals $C_B$ and $O_B$ will represent the two background counting rates, respectively.

As hereinbefore stated, the carbon and oxygen signals heretofore derived for the purpose of determining the ratio of carbon to oxygen are actually composites or summations of signals due to the carbon and its background, and of signals due to the oxygen and its background, respectively. Accordingly, it will now be readily apparent that signals (C-$C_B$) and (O-$O_B$) are more precise indications of the carbon and oxygen content of the formations being irradiated. Further, the background signals $C_B$ and $O_B$ can be used to provide a better signal-to-background ratio.

As will hereinafter be apparent, the slope of the entire gamma ray spectrum is dependent upon the composition as well as the porosity of the formation. Thus, a better indication of the carbon-to-oxygen ratio will be obtained by the ratio C':O', where C' is the difference between C and $C_B$, and where O' is the difference between O and $O_B$, since C' and O' are obviously less dependent on the intensity of the background gamma rays which are sought to be eliminated from the carbon and oxygen measurements. Even if C' and O' are treated merely as qualitative indications or representations of the carbon and oxygen in the formations of interest, fractional changes in the hydrocarbon content of these formations will produce greater and more easily observed variations in C' and O', and the ratio C':O' will be less dependent on the porosity and type of formation.

As hereinbefore explained, a water-bearing limestone contains a substantial amount of carbon, due to the calcium carbonate character or composition of the formation matrix. Nevertheless, the output signals from the aforementioned four windows in the pulse height analyzer provides a clear basis for distinguishing between increases in the carbon:oxygen ratio which are due to the presence of oil or gas and those increases which occur when the logging instrument passes from a sandstone matrix to a limestone matrix.

Since the nuclear interactions which occur in a sandstone matrix are necessarily different from those which occur in a limestone matrix, these differences are usually distinctive in the slopes of their secondary gamma ray spectra because of different capture and inelastic scattering cross sections of calcium and silicon. Thus, the ratio of $O_B$:$C_B$ will usually provide a sufficient indication of whether the formation matrix is limestone or sandstone.

The inelastic scattering reactions in the matrices occur substantially only as long as the neutrons are "fast"; however, whereas most of the capture reactions occur when the neutrons have slowed to thermal energy. If the neutron source is an accelerator, and if the logging tool is provided with suitable detector gating circuitry, the accelerator may be pulsed so as to generate fast neutrons in discrete bursts. Thus, the output signal from the detector may be correlatively gated to select only the pulses which occur during each neutron burst from the accelerator, and during which a maximum number of inelastic scattering reactions will occur. A second time-dependent portion may also be selected, after termination of each such neutron burst from the accelerator, and preferably also after all or most of the thermal neutrons in the borehole have been captured, to provide a second signal which will be heavily dependent on gamma radiation resulting from neutron capture in the irradiated formation.

The use of the aforementioned four windows and only one gate will generally provide a simultaneous measurement of both the type of formation matrix and the $C':O'$ ratio for the formation. If additional information is needed, however, capture gamma rays in the second time dependent interval might also be utilized for lithology and porosity determination.

It will be recognized that changes in the porosity of the adjacent earth materials will produce changes in the $C':O'$ ratio measurement, even in those instances when the actual carbon and oxygen concentrations have not changed, and thus it is preferable to also derive a supplemental indication of porosity which may be used to better interpret the $C':O'$ ratio signal. Also, porosity measurements are desirable in determining water saturation. A measurement which is indicative of porosity is the count rate of either or both of the two background signals, and preferably (because of statistics) a summation of the signals from all four windows of the analyzer.

These and other advantages and features of the present invention will become apparent from the following detailed description wherein reference will be made to the figures in the accompanying drawings.

IN THE DRAWINGS

FIG. 1 is a simplified and substantially functional representation of one form of apparatus which is especially suitable for the purposes of the present invention.

FIG. 3 is a graphic representation of the rate of occurrence of radiations detected at various energies throughout the composite inelastic spectrum of such radiations and providing an illustrative representation of the variations in intensity which may appear at measurable energy levels for radiation resulting from certain preselected nuclear reactions of interest in the present invention.

DETAILED DESCRIPTION

Figure 4:
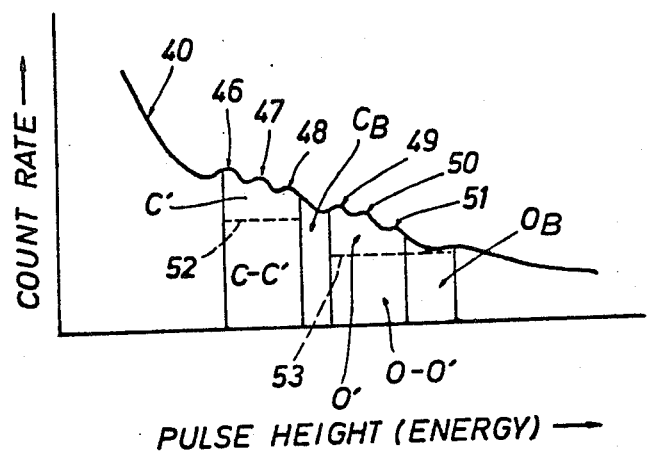
FIG. 4 is a graphic representation of the composite inelastic radiation spectrum illustrated in FIG. 3, and showing in particular the relative proportions of unwanted background radiation which is necessarily obtained when an energy-dependent measurement is made of variations in intensity of gamma radiations emanating from the irradiated formation depicted in FIG. 1.

Referring now to FIG. 1, there may be seen a simplified functional and partly pictorial representation of the basic features of a well-logging system which is illustrative of features of the present invention. More particularly, the system may be seen to be composed of a subsurface probe or sonde 2 which is suspended at one end of a conventional logging cable 18 and which provides data in the form of electrical signals to surface instrumentation which is connected to the other or upper end of the cable 18.

Referring to the system in greater detail, the sonde 2 is illustrated as being composed of a fluid-tight elongated steel housing 2, which is adapted to be passed longitudinally through a borehole 4 in the earth 3, and which contains a neutron source 6 and a radiation detector which, for present purposes, is preferably a scintillation counter 10. As previously explained, the function of the neutron source 6 is to bombard adjacent sections of the earth 3 and borehole 4 with high energy neutrons as the sonde 2 is lifted through the borehole 4 by the cable 18, and the function of the scintillation counter 10 is to detect a representative number of the gamma rays emanating from the earth 3 as a result of such neutron bombardment. Accordingly, a radiation shield 9 of suitable composition is preferably interposed between the scintillation counter 10 and the neutron source 6 to prevent direct irradiation of the scintillation counter 10 by the source 6.

As also previously explained, the neutron source 6 may be any suitable means for generating neutrons of sufficient energy to produce inelastic scattering reactions in the adjacent earth 3. Accordingly, the neutron source 6 may be an encapsulated quantity of material such as radium or plutonium mixed with a light metal such as beryllium or lithium. A neutron source 6 also produces a substantial amount of unwanted gamma radiation which is detected by the scintillation counter 10, however, and is also less desirable for present purposes since neutron emission from this type of source 6 cannot conveniently be interrupted. Furthermore, neutrons produced by a capsule-type source 6 tend to be emitted at various energies which is also detrimental to the meaningfulness of the measurements sought to be obtained. Accordingly, for present purposes the neutron source 6 which is preferred is a static ion accelerator 7 of the type which employs the well known deuterium-tritium reaction to generate a substantially gamma-free supply of 14.4 Mev. neutrons. In addition, an actuating circuit 8 of conventional design is preferably included whereby the accelerator 7 may be selectively activated and inactivated on command.

Referring again to the structure generally illustrated in FIG. 1, the scintillation counter 10 may be of conventional design and thus may include a phosphor or crystal 11 which is preferably optically coupled to the appropriate end of an end-window photomultiplier tube 12, and which is also preferably composed of a suitable inorganic material such as thallium-activated sodium or cesium iodide or the like. As is well known, each gamma ray stopped by the crystal 11 tends to create a momentary light flash or scintillation within the crystal 11 of an intensity substantially proportional to the terminal energy of the stopped gamma ray. The photomultiplier tube 12 is adapted to produce a voltage pulse for each such scintillation which is of an amplitude substantially proportional to the intensity of the scintillation, and thus the output signal which is generated by the photomultiplier tube 12 is a train of pulses tending to indicate the rate of occurrence and the terminal energies of the gamma radiation existing within the adjacent section of the borehole 4.

Not all of the gamma rays which occur in the borehole 4 arise because of fast neutron interactions within the adjacent earth 3, of course, and thus the crystal 11 tends to produce a certain proportion of unwanted scintillations which are due to the occurrence of thorium and other naturally radioactive substances which tend to accumulate in shales and other like strata. In addition, some of the voltage pulses which are generated in the photomultiplier tube 12 are merely due to circuit noise. Most of these spurious or unwanted signals are relatively low voltage, however, and thus the output signal from the photomultiplier tube 12 may be conveniently "cleaned up" by coupling it to a pulse height discriminator 13 having its trigger level set to pass only pulses of a preselected minimum voltage. This discriminator might also assist in alleviating any pulse pile-up problems in the transmission of signals over the logging cable 18.

The sonde 2 may be required to be positioned deep in the earth 3, and thus it may be necessary to employ a logging cable 18 which is several thousand feet long to deliver the output pulses from the discriminator 13 to the surface of the earth 3. Accordingly, a conventional voltage amplifier 14 is preferably included within the sonde 2, which has its input coupled to receive pulses from the discriminator 13, and which may have its output coupled to a suitable conductor 17 in the cable 18. Alternatively, a conventional cable driving circuit 15 may be coupled between the amplifier 14 and the cable 18 as indicated in FIG. 1.

As previously indicated, it is a principal feature of the present invention to detect and measure those gamma rays which arise from inelastic neutron scattering reactions with carbon and oxygen nuclei in the earth materials surrounding the sonde 2. The fast neutron which is inelastically scattered also tends to be slowed to thermal energy and thereafter captured, however, and this also generates a gamma ray which may be detected. If the neutron source 6 depicted in FIG. 1 is an encapsulated neutron-emitter, this creates a relatively steady outflow of fast neutrons which are constantly and continuously being elastically and inelastically scattered in the materials surrounding crystal 11, and which are also being continuously slowed and captured by such materials. Consequently, the radiation surrounding the crystal 11 is composed of gamma rays being continuously produced by capture reactions as well as inelastic scattering reactions, and since capture-produced gamma rays have initial energies within the same general range as those resulting from inelastic scattering, this is a principal reason why it has heretofore been substantially impossible to use a continuously-emitting neutron source to make a meaningful measurement of the carbon and oxygen adjacent a borehole 4.

On the other hand, if the neutron source 6 is an accelerator 7, as indicated in FIG. 1, and if the actuating circuit 8 is arranged and adapted to cause the accelerator 7 to sequentially and intermittently generate the fast neutrons in discrete bursts, a time-dependent gamma ray measurement may be made which emphasizes the gamma rays arising from fast neutron processes and which de-emphasizes the gamma radiation produced by slow or thermal neutron capture.

Each fast neutron burst produced by the accelerator 7 will, if properly timed, tend to create a corresponding discrete fast neutron population in the materials surrounding the crystal 11, and each discrete fast neutron population thus tends to decline away at a rate which is dependent upon the macroscopic inelastic and elastic scattering cross section of such materials. Each disappearing fast neutron population is replaced by a discrete thermal neutron population, however, which thereafter declines at a rate which is dependent upon the macroscopic capture cross section of the surrounding material. Accordingly, if the accelerator 7 is actuated to generate each fast neutron burst at a rate which is such that each resulting thermal neutron population substantially disappears before the next succeeding fast neutron burst is produced, it will be apparent that there will be a measurable time interval during which a much heavier proportion of the gamma radiation at the detector 4 will be attributable to fast neutron reactions in the materials surrounding the crystal 11 and housing 5.

The actuating circuit 8 depicted in the sonde 2 may be arranged and adapted to independently energize the accelerator 7 according to a predetermined operating sequence. As indicated in FIG. 1, however, the surface equipment may conveniently include a pulse generator 24 of suitable design which is arranged to be triggered or activated by a variable timing circuit 23, and which provides a suitable trigger pulse 21 to an appropriate conductor 16 in the cable 18.

As will be apparent from the foregoing, the measurement sought to be obtained is preferably time dependent as well as energy dependent, and thus it is only the gamma rays which occur during a particular portion of the system operating cycle which are of principal importance in the practice of the present invention. A convenient technique for making a time dependent radiation measurement is to activate and inactivate the scintillation counter 10 in cyclic relationship to the operation of the accelerator 7, and circuitry is available in the prior art for suitably performing this function, either independently according to a predetermined sequence, or in synchronism with the operation of the accelerator 7. An especially convenient technique for making a time dependent radiation measurement, however, is to synchronously gate the output signal from the amplifier 14 substantially concurrently with the operation of the actuating circuit 8, for the reason that most of the fast neutron processes will occur while the accelerator 7 is actuated to produce neutrons.

As indicated in FIG. 1, however, the surface equipment may conveniently include a gating circuit 25 having its input 20 coupled to the cable 18 to receive the pulse train arriving uphole from the sonde 2, and having its output 20A coupled to the input of a suitable multichannel pulse height analyzer 26 of conventional design. The gate 25 is, of course, arranged and adapted to be normally closed and to open only in conjunction with the production of neutron bursts by the accelerator 7. Accordingly, the timing signal 22 which is generated by the timing circuit 23, and which is applied to the input 22B of the pulse generator 24, is also simultaneously applied to the input 22A of the gate 25.

As hereinafter explained in detail, the pulse height analyzer 26 is preferably adjusted to establish four different energy ranges or "windows," and thus pulses received from the output 20A of the gate 25 will be sorted into four different outputs 26A-D. As will also be explained in detail, output 26A will be composed of pulses with amplitudes commensurate with gamma rays produced by carbon nuclei, and output 26B will include pulses with amplitudes corresponding to carbon background signals which are only a little higher than the upper level of the so-called "carbon window." Similarly, output 26C will include pulses corresponding to gamma rays generated by inelastic scattering reactions with oxygen nuclei, and output 26D will include pulses with amplitudes only a little higher than the upper level of the so-called "oxygen window." Accordingly, signal 26B will derive from the "carbon background window" in the analyzer 26, and signal 26D will derive from its "oxygen background window."

As may further be seen in FIG. 1, outputs 26A-D are each connected to a different one of four separate count rate meters 32-35. It is a feature of the present invention to provide a measurement of the sum of these four count rates, and thus the four outputs 26A-D are also preferably coupled to a fifth count rate member 31. It is also a function of the present invention to derive a corrected carbon:oxygen ratio, and thus a difference circuit 28 is preferably included to provide an electrical voltage 28A which is functionally related to the difference between the carbon count rate 32A and the carbon background count rate 33A. Similarly, another difference circuit 29 may be included to provide a voltage 29A which is functionally related to the difference between the oxygen count rate voltage 34A and the oxygen background count rate voltage 35A.

A conventional ratio circuit 30 may be included to derive a ratio signal 30A from the two difference voltages 28A and 29A, and the ratio signal 30A may be conveniently applied to one of the inputs of a suitable chart recorder 27 or the like. The summation signal 31A from the count rate meter 31 may also be applied simultaneously to the recorder 27.

It is desirable that both signals 31A and 30A be recorded in correlation with an indication of the depth of the sonde 2 in the borehole 4, as well as in correlation with each other. This may be accomplished in any of several well known ways, however, such as by connecting the driving mechanism of the chart recorder 27 to a sheave wheel 19 which is rotated by movement of the cable 18.

As hereinbefore stated, it is a feature of the present invention that a more representative measurement of the carbon and oxygen content of the earth 3 be provided by making a time-dependent measurement of the radiation emanating from the earth 3 as a result of the neutrons generated by the accelerator 7. The fast neutron population which is produced by each actuation of the accelerator 7 will tend to disappear very quickly, since a fast neutron tends to slow to thermal energy within a very short time interval. Thus, it is preferable that the actuator 8 be adapted to "turn on" the accelerator 7 for an interval which is sufficient to extend through the average lifetime of the fast neutron population but which is preferably terminated before the resulting slow or thermal neutron population grows to appreciable size.

Figure 2:
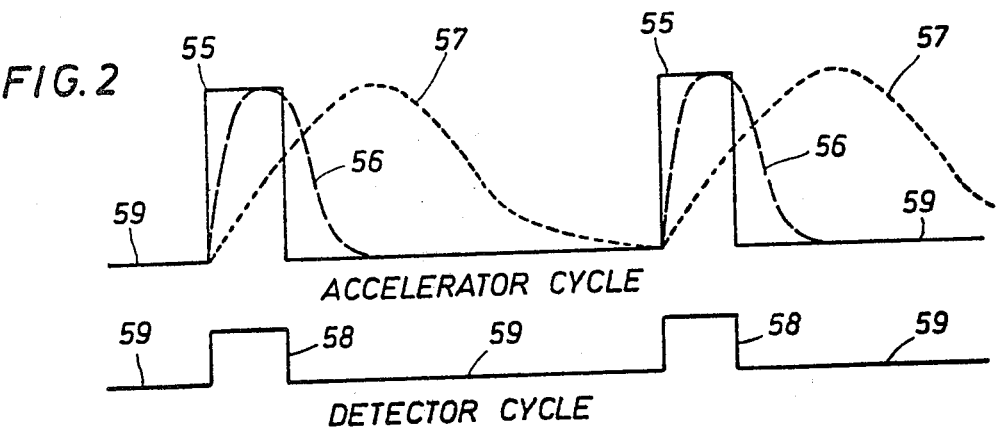
FIG. 2 is a graphic representation of a suitable operating sequence for the apparatus depicted in FIG. 1, and more particularly illustrating how the appropriately time-dependent detection of gamma radiation in the borehole will provide a more accurate and dependable measurement of the carbon:oxygen ratio for an irradiated earth formation.

Referring now to FIG. 2, there may be seen a simplified functional illustration of the operating cycle 59 of the system depicted in FIG. 1 and, more particularly, an illustration of a preferred operating sequence for both the neutron source 6 and the gate 25. Specifically, the accelerator 7 is preferably actuated to produce a series of discrete fast neutron bursts 55 which each tends to create a discrete fast neutron cloud or population 56.

For example, the accelerator 7 may be turned on for an irradiation interval of about 5-10 microseconds to produce the fast neutron population 56 which permeates the section of borehole 4 and earth 3 immediately surrounding the section of the sonde 2 which contains the accelerator 7 and crystal 11. As indicated in FIG. 2, the rise time of the fast neutron population 56 may be almost instantaneous if the accelerator 7 is operating effectively.

The irradiation or activation interval 55 should be long enough to produce an adequate number of fast neutrons. However, the interval 55 should otherwise be kept as short as is reasonably possible since the average slowing time of a fast neutron in the earth 3 is very short and is even shorter for those fast neutrons which are in the fluids in the borehole 4. This is illustrated in FIG. 2 by the fact that the rise rate of the thermal neutron population 57 is only a little slower than the rise rate or time of the fast neutron population 56.

It should be understood that, as indicated in FIG. 2, the rise rates or times for both the fast and slow (thermal) neutron populations 56 and 57 will be the same whether the accelerator or irradiation interval 55 is long or short in duration. This is because the fast neutron population 56 tends to reach an equilibrium once the rate of decline of the fast neutrons tends to equal the output rate of the accelerator 7. As further indicated in FIG. 2, however, the irradiation interval 55 of the system operating sequence 59 may be terminated before the thermal neutron population 57 reaches its peak, whereupon the majority of the neutrons which are present in the borehole 4 and earth 3 adjacent the sonde 2 during the irradiation interval 55 will be fast neutrons.

As hereinbefore explained, the fast neutrons in the fast neutron population 56 undergo fast neutron reactions with the nuclei in the borehole 4 and earth 3, since this is why these fast neutrons are slowed to thermal energy to create the thermal neutron population 57. Thus, there will be a corresponding population of gamma rays created in the borehole 4 and earth 3 as a result of these fast neutron processes, and this gamma ray population (not depicted in FIG. 2) will be substantially coincident in rise and decline rate with the rise and decline of the fast neutron population 56.

The slow or thermal neutron population 57 will also decline away during a measurable interval due to capture reactions in the borehole 4 and earth 3, albeit over a much longer time interval than that required to accomplish the disappearance of the fast neutron population 56. These capture reactions are also evidenced by the production of gamma rays, and thus there will be a capture gamma ray population (not depicted) created which will be substantially coincident in rise and decline with the rise and decline of the thermal neutron population 57. Thus, it will be apparent that there will be a measurable interval during which the gamma ray population in and around the sonde 2 will be substantially composed of gamma rays arising from inelastic scattering of fast neutrons, provided that, as indicated in FIG. 2, each irradiation interval 55 is scheduled to commence only after the preceding thermal neutron population 57 (and capture gamma population) has substantially disappeared.

It will be recognized that 14.4 Mev. neutrons are capable of producing many threshold-type reactions other than inelastic scattering reactions with carbon and oxygen nuclei. In particular, many oxygen nuclei will be transformed to the unstable nitrogen-16 isotope which tends to emit gamma rays as it reverts to its stable form. As is well known, nitrogen-16 has a half-life of about 8 seconds. Accordingly, even if the accelerator 7 is actuated for only about 5-10 microseconds out of each one-thousand microseconds of system operating time, it will nevertheless be apparent that a substantial amount of gamma radiation will soon be existent in the borehole 4 which is due neither to capture or inelastic scattering of these 14.4 Mev. neutrons.

The number of neutron events will at all times be dependent upon the distance from the neutron source 6 in the sonde 2. It is also customary to log any borehole 4 in an upward direction in order to compensate for cable stretch in determining depth in an accurate manner. Accordingly, the neutron source 6 is conventionally located below the scintillation counter 10 or other detector, and in the lower end of the sonde 2, whereby the scintillation counter 10 will tend to move from and not toward these activated nuclei. This, in turn, tends to reduce the proportion of the gamma ray population which is attributable to nuclei which have been activated during the irradiation interval 55.

Referring again to FIG. 2, it will be seen that the gate 25 depicted in FIG. 1 may be opened and closed to provide for a detection interval 58 which is substantially coincident with the occurrence and duration of the irradiation interval 55, whereby the gamma rays which bombard the crystal 11 during this period will have primarily resulted from inelastic scattering of fast neutrons generated by the accelerator 7. A detection interval 58 which is only 5-10 microseconds in duration will permit only a relatively small number of gamma rays to be counted, however, and thus it is desirable to employ as large a crystal 11 as is practical, and also to establish a reasonably close spacing between the neutron source 6 and the crystal 11, in order to maximize the number of gamma rays which are detected in this manner. As further indicated in FIG. 2, it may also be desirable to even extend the detection interval 59 a little beyond the termination of the irradiation interval 55, since some fast neutrons will still be present in the earth 3 during the 2 or 3 microseconds following termination of the irradiation interval 55.

Referring now to FIG. 3, there may be seen a simplified representation of a typical composite spectrum 40 of the gamma ray population which permeates the borehole 4 and earth 3 as a result of each actuation of the accelerator 7. As indicated, gamma ray counting rate tends to increase as the trigger level of the analyzer 26 is decreased, which is due not only to the fact that more gamma rays are initiated with lower rather than higher energies, but also because the gamma rays having higher initial energies tend to be slowed by Compton scattering reactions before disappearing.

It is well known that a gamma ray which is produced by an inelastic scattering reaction may have almost any initial energy. Nevertheless, there are predictable resonances in the counting rates for gamma rays emanating from specific types of nuclei, and if such nuclei are present in an irradiated material in sufficient amounts, these resonances will manifest themselves as "peaks" on the spectrum 40 to indicate the presence of an excessive or abnormal number of such nuclei.

For example, the composite spectrum of gamma radiation emanating from an irradiated mass or quantity of pure carbon will show characteristic gamma ray and escape peaks at 3.4 Mev., 3.9 Mev., and at 4.4 Mev. values. Similarly, the gamma ray spectrum from an irradiated quantity of pure oxygen will show characteristic gamma ray and escape peaks at 5.1 Mev., 5.6 Mev., and 6.1 Mev. values.

Referring again to FIG. 3, it will be seen that the composite spectrum 40 of the gamma rays which are detected during the detection interval 58 exhibits six characteristic peaks 46–51 which, for purposes of illustration, may be attribured to the two characteristic gammas at 4.4 and 6.1 Mev. Thus, the height of these peaks 46–51 may be taken as a functional representation of the proportion of carbon and oxygen which are present in the borehole 4 and earth 3 immediately surrounding the sonde 2.

Not all gamma rays which are detected with a terminal energy of 3.4 Mev. will, of course, have issued from a carbon nucleus which has engaged in an inelastic scattering reaction with a fast neutron, and the total count rate at the 3.4 Mev. energy level will obviously include radiations which had higher initial energies. Nevertheless, if the carbon peaks 46–48 are predominant in size, this can only be interpreted as an indication that an abnormal amount of carbon has been encountered by the sonde 2 at that particular depth in the borehole 4.

The shape of the composite spectrum 40 will be affected to a considerable degree, of course, by whether the gamma radiation which is detected is predominantly composed of gamma rays arising from inelastic scattering reactions, or whether a substantial number of capture gamma rays are also present. In other words, if the accelerator 7 is permitted to operate steadily rather than intermittently, as hereinbefore explained, the shape of the composite spectrum 40 may be altered to the extent that the carbon peaks 46–48 may not be discernible even though the sonde 2 is kept at the same depth in the borehole 4.

It will be apparent, therefore, that it is an important feature of the present invention that the accelerator 7 be actuated to produce discrete bursts of neutrons as hereinbefore explained. It is also important that the gate 25 be actuated or opened selectively as explained, since pulses in the detector signal 20 which arrive within the period immediately following each irradiation interval 55 will, as illustrated in FIG. 3, be almost entirely attributable to gamma rays occurring for reasons other than inelastic scattering of fast neutrons.

It will also be apparent that even if the system is operated according to the sequence 59 illustrated in FIG. 2, and even if the composite spectrum 40 is composed substantially of inelastic scattering gamma radiation, much if not most of this radiation is unwanted insofar as the purposes of the present invention are concerned. Accordingly, it is preferable that the pulse height analyzer 26 be adjusted to establish a so-called "carbon window" which will encompass the portion of the spectrum 40 which is attributable to gamma rays issuing from carbon nuclei, and also a similar "oxygen window" to encompass the portion of the spectrum 40 attributable to oxygen gamma rays. In the prior art techniques which have been sought to be used for this purpose, the carbon window has been established between the energy levels 41 and 43 indicated in FIG. 3, and the oxygen window has been established between levels 43 and 45. More particularly, the lower energy level 41 of the carbon window has usually been established at about 3.0 Mev., and the upper level 43 at or about 5.0 Mev. Similarly, the upper and lower levels 45 and 43 chosen for the oxygen window have usually been established at or about 7.0 Mev. and 5.0 Mev., respectively.

In both the carbon and oxygen windows, and especially in a relatively narrow energy range at or near the upper portions of each of these two windows, much of the detector signal 20 is attributable to unwanted radiation arising from thermal neutron capture and from fast neutron processes such as inelastic scattering by nuclei of the housing 5, to Compton degraded carbon and oxygen gamma radiation from the surrounding earth 3, and to inelastic gammas from other elements in the earth 3. Although these components of the detection signal 20 can be useful in the determination of the character of the matrix of the adjacent earth 3, as will hereinafter be explained, a measurement of capture and inelastic gamma radiation originating in the borehole 4, in the wall of the housing 5, or from earth elements other than carbon and oxygen, has little or no relationship to whether oil is present in the earth 3. Thus, such radiation constitutes an unwanted factor in any measurement based on the ratio of carbon and oxygen. Accordingly, if the outputs from the carbon and oxygen windows in the analyzer 26 can be adjusted so as to delete or at least neutralize these unwanted signal factors, it will be apparent that a determination of the ratio of carbon to oxygen which incorporates such adjustment will be less dependent on the porosity and composition of the matrix of the adjacent earth 3, and will accordingly be more a function of the oil content of such matrix.

In addition, it will be apparent that the shape of the composite spectrum 40 is dependent to a considerable extent on the hydrogen content of the irradiated earth 3, and therefore on the porosity of the matrix, and this is especially true if the gate 25 is opened for a longer rather than a shorter period, and if a larger rather than a smaller proportion of the detected gamma radiation is composed of capture gamma radiation. Deletion of this special background component from the signals obtained from the carbon and oxygen windows will obviously increase resolution of the remaining portions of the composite spectrum 40, and will therefore clearly improve or enhance any measurement of the carbon-:oxygen ratio which may be obtained in this manner.

Accordingly, the pulse height analyzer may be further adjusted to establish a minimum carbon background trigger level 42, and a similar minimum oxygen background trigger level 44, whereby four separate windows will be provided. The trigger level 42 should be chosen so that it is low enough to encompass as much carbon background as is practical, but also high enough so that valid carbon gamma pulses will not be included within the background component. The highest energy oxygen peak 51 is found at or about 6.1 Mev., as hereinbefore stated, and thus the lower oxygen background trigger level 44 may appropriately be set at or about 6.5 Mev.

Referring again to FIG. 1, it may be seen that if the pulse height analyzer 26 is set with four different windows as hereinbefore proposed, signal 26A will correspond to the pulses falling within the carbon window defined by the energy range of 3.0 Mev.–4.7 Mev. as indicated in FIG. 3 by trigger levels 41–42. Thus, signal 26B will be composed of the pulses falling within the carbon background window defined by the energy range of 4.7 Mev.–5.0 Mev. as indicated by trigger levels 42–43 depicted in FIG. 3. Similarly, output signal 26C will be composed of the pulses falling within the oxygen window defined by the energy range 5.0 Mev–6.5 Mev, as indicated by trigger levels 43–44, and the output signal 26D will constitute those pulses in signal 20 which fall within an energy range of 6.5 Mev–7.5 Mev. which is the oxygen background window defined in FIG. 3 by trigger levels 44–45.

It will readily be apparent from the foregoing explanation that the ratio of signal 26A to signal 26C will provide an accurate representation of the carbon:oxygen ratio in the matrix of the earth 3, and this is especially true when the accelerator 7 is actuated as indicated in FIG. 2 and the gate 25 is cycled to provide a time dependent measurement as hereinbefore explained. Accordingly, signals 26B and 26D may be discarded (except for purposes of deriving lithology information, and the summation obtained by count rate meter 31), and an accurate and dependable measurement of carbon:oxygen may be obtained by merely coupling signals 26A and 26C directly to the inputs of a third ratio meter 230. This ratio meter 230 produces an output signal 230A which is directly proportional to the uncorrected carbon:oxygen ratio.

As hereinbefore stated, a gamma ray is highly susceptible to loss of energy as a result of experiencing Compton scattering, and thus at least a portion of the pulses in signals 26A and 26C will be caused by degraded gamma radiation. Another portion will be caused by capture gamma rays and gammas from the formation matrix and borehole casing. The number of unwanted pulses in signals 26A and 26C will be greater or lesser depending upon whether the pulse rate of signals 26B and 26D, respectively, is greater or lesser. Accordingly, it can be assumed that the unwanted component of signal 26A is proportional to the size of signal 26B, and the unwanted component of signal 26C is also proportional to the size or magnitude of signal 26D.

Referring now to FIG. 4, there may be seen a representation of the composite spectrum 40 depicted in FIG. 3, but wherein horizontal lines 52 and 53 have been drawn between trigger levels 41–42 and 43–44, respectively. The purpose and vertical location of line 52 is to define the number of pulses (above line 52) which would have been counted if no carbon background signals were present in signal 26A, and to define below line 52 the number of carbon background signals which nonetheless are present and must be deleted. Similarly, the vertical location of line 53 defines the number of oxygen background pulses (below line 53) which have been included in signal 26C.

A realistic basis for determining the appropriate vertical locations of lines 52 and 53 in FIG. 4, and therefore the number of unwanted pulses in signals 26A and 26C, is to merely assume that the unwanted pulses in signals 26A and 26C are equal to the magnitudes of signals 26B and 26D, respectively. Accordingly, and as indicated in FIG. 1, signals 26A and 26B are preferably coupled to a difference circuit 28, which provides a difference in signal 28A which is applied to one of the inputs of the aforementioned ratio meter 30. Similarly, signals 26C and 26D are coupled to a difference circuit 29 having its output 29A coupled to the other input of the ratio meter 30. In this manner, the ratio signal 30A which is applied to the recorder 27 (assuming statistics to be adequate) provides an extremely accurate representation of the ratio of the carbon and oxygen surrounding the crystal 11 in the sonde 2. This is because the signal 30A is now much less dependent on the amount of background radiation which may be present. Furthermore, fractional variations in the carbon:oxygen ratio will be more apparent with signal 30A.

The gamma ray which appears when a fast neutron is inelastically scattered by a carbon nucleus in an oil molecule is indistinguishable from the gamma which appears when the scattering carbon nucleus is in the matrix of a limestone formation. Thus, the type of formation marix which is present is important to the present invention, not only insofar as the slope or shape of the composite spectrum 40 is concerned, but also insofar as the size (and therefore the significance) of the carbon peaks 46–48 are concerned.

Since limestone and sandstone formations have basically different chemical compositions, it may be expected that they will also have different characteristics for nuclear interactions. Further, they may be reasonably expected to have different composite secondary gamma spectra. It is known that when a fast neutron is inelastically scattered by a silicon nucleus, the resulting radiation may be expected to have an energy distribution with a higher mean value than a corresponding distribution from calcium. Accordingly, the counting rate of the pulses composing signal 26B may reasonably be expected to be significantly higher when the formation in question has a limestone matrix than when it is composed of sandstone. Similarly, the so-called "oxygen background" signal 26D may include a larger number of radiations resulting from inelastic scattering of neutrons by silicon nuclei than by calcium.

It will be apparent from the foregoing that a measurement of the ratio of the carbon background radiation to the oxygen background radiation may provide a basis for determining whether the formation in question is sandstone or limestone, and that such a measurement is therefore especially useful in correlation with an improved carbon:oxygen log according to the principles of the present invention. Referring again to FIG. 1, therefore, it may be seen that the output signals 33A and 35A may also be conveniently coupled to the input side of another ratio meter 130 having its output signal 130A separately but correlatively coupled to the recorder 27 along with signals 30A and 31A to provide this information.

It should be noted, however, that the magnitude of signals 30A and 130A will also be dependent upon the porosity of the formation in question. The inelastic gamma ray counting rate is to some degree dependent on the hydrogen content of the formation, since, with more hydrogen present, gamma rays originate further from the detector. Count rates are therefore lower in high porosity formations, and thus the composite inelastic scattering spectrum 40 or, as an approximation, the sum of signals 26A, 26B, 26C, and 26D from the formation in question can be employed, signal 31A, to indicate the porosity of the formation. Thus, it is desirable to correlate the aforementioned carbon:oxygen signal 30A, and the background ratio signal 130A, with a measurement of the sum of the inelastic gamma radiation 31A which results from each actuation of the accelerator 7.

Figure 5:
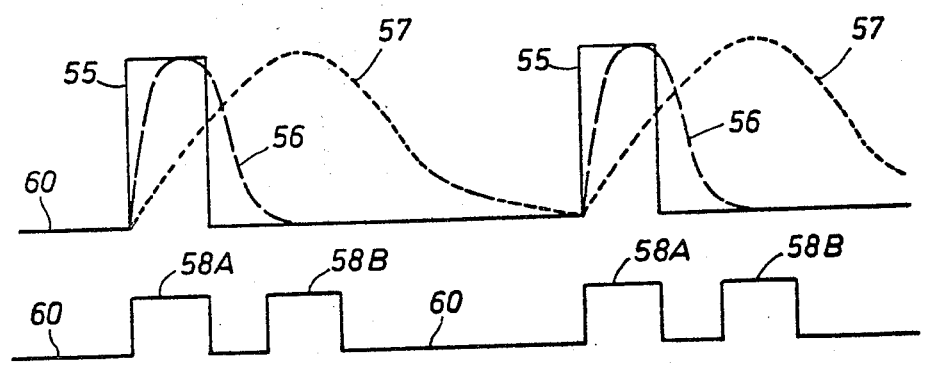
FIG. 5 is a graphic representation of the irradiation and detection intervals obtained by use of an operating sequence other than that illustrated in FIG. 2, and more particularly depicting how a subsequent time-dependent radiation measurement can be obtained which is functionally related to the porosity of the formation matrix.

Referring now to FIG. 5, there may be seen a representation of a different system operating sequence or cycle 60, wherein the accelerator 7 is pulsed during the same or substantially the same irradiation interval 55 as illustrated in FIG. 4. However, in the case of this sequence 60, there is in addition to a first detection interval 58A, which is directed to the inelastic scattering gamma radiation, a second detection interval 58B following each irradiation interval 55. Moreover, as further illustrated in FIG. 5, this second detection interval 58B is preferably timed to commence only after the inelastic scattering gamma rays have substantially all be absorbed, whereby the gamma rays occurring during this second later detection interval 58B will largely be composed of gamma rays resulting from capture of the neutrons in the slow or thermal neutron population 57.

Although the duration of this second detection interval 58B is indicated in FIG. 5 to be the same as that of the first detection interval 58A, the second interval 58B may be of any duration provided it does not extend into the next succeeding irradiation interval 55. Of course, it should be appreciated that not all of the fast neutrons produced by the accelerator 7 during each irradiation interval is inelastically scattered, and that many will translate stable nuclei into unstable nuclei having a measurable half-life. Moreover, gamma radiation from naturally occurring radioactive materials can always be anticipated to be present in the earth 3, and this radiation is detectable at any time. Accordingly, it is frequently preferable to terminate the second detection interval 58B before the thermal neutron population 57 declines to insignificant proportions, whereby the gamma rays which are detected during the second interval 58B are predominately those which result from thermal neutron capture.

It should also be noted that most wells are normally filled with fluids such as drilling mud, brine, and even oil. Hydrogen is well known to be much more efficient at slowing down neutrons than any other element, and thus the time required to slow down neutrons in the borehole to thermal energy will usually be much less than that of any fluid-bearing formation in the earth 3. In addition, the hydrogen and chlorine in the borehole are more efficient at capturing thermal neutrons than the elements in most typical formations. Accordingly the portion of the thermal neutron population 57 which occupies the borehole 4 may be expected to disappear earlier than the portion of such population 57 which permeates the earth 3.

It is the capture gamma radiation which emanates from the earth 3 which is of interest and not the capture gamma radiation which originates in the borehole 4. Accordingly, if the initiation of each of the later detection intervals 58B is delayed until the thermal neutrons in the borehole 4 have substantially disappeared, the capture gamma radiation which is thereafter counted may reasonably be attributed entirely to the lithological characteristics of the earth 3, and the effect of the borehole 4 will thereby be substantially eliminated.

The second detection interval 58B may be obtained by causing the timer circuit 23 in FIG. 1 to actuate twice, whereby the gate 25 will be caused to open twice during each operating cycle. The four windows in the pulse height analyzer 26 will still pass only pulses as defined by the windows, however, and thus the signals 30A and 130A which would appear as a result of the second detection interval 58B would not only be meaningless but would tend to confuse the meaning of the signal 30A and 130A generated during the first interval 55A, and should not be allowed to contribute to signals 30A and 130A.

Referring again to the system depicted in FIG. 1, there may be seen certain additional components and circuitry which have not previously been discussed but which are included for the purpose of making another porosity measurement in addition to 31A, in correlation with the measurements represented by signals 30A and 130A. In particular, there may be seen a second gate 39 having its input side connected to receive the detection pulses 20 directly from the cable 18, and which has its output 39A coupled to another count rate meter 36. It will further be seen that a suitable delay circuit 37 is included which has its input 22C coupled to receive the timing signal 22 from the timing circuit 23, whereby it will transmit a suitable actuating signal 38 to the second gate 39 at an appropriate time following receipt of the timing signal 22C. Accordingly, the second gate 39 will now open for the predetermined second detection interval 58B following the initiation of each irradiation interval 55 by the timing signal 22.

As thus arranged, the count rate meter 36 will receive all of the pules which occur in the detection signal 20 during the second detection interval 58B. Accordingly, the voltage signal 36 which is preferably recorded by the recorder 27 separately but in correlation with the ratio signals 30A and 130A, as well as the summation porosity signal 31A, will provide a functional representation of the count rate for the capture gamma ray population generated as a result of each irradiation interval 55. This information 36A will be used as a porosity indicator.

Moreover, it may be desired to provide a signal indicative of lithology which is derived from thermal neutron capture data to go along with the thermal capture porosity indicator signal 36A whose derivation has just been described. To this end the output signal 39A from the thermal time gate 39 is provided to another pulse height analyzer 40 for breakdown into another energy spectral analysis similar to that previously described with respect to the pulse height analyzer 26. In this instance, however, it is sought to obtain an indicator of the relative amounts of silicon, Si, and calcium, Ca, to aid in distinguishing the lithology as being either basically sandstone or basically limestone.

It is known, for example, that silicon exhibits a thermal capture gamma ray peak at approximately 3.54 Mev. It is also known that calcium exhibits a thermal neutron capture gamma peak at approximately 6.41 Mev. Discrete energy windows to measure the relative magnitude of these two known peaks, in pulse height analyzer 40, however, are preferably not chosen symmetrically about these energies. Interference from capture gammas from other formation and borehole elements has led to the choice of an energy window in the 2.5 to 3.2 Mev. range to detect the Si peak and an energy window in the 5.2 to 6.25 Mev. range to detect the Ca peak.

The output of counts in each of these respective energy windows from pulse height analyzer 40 are supplied to a ratio meter 43 which produces an output signal 43A proportional to the Si/Ca ratio based on this two energy window measurement. The lithology signal 43A may then be recorded on a recorder 27 in depth correlation with the previously discussed signals 30A, 130A, 31A and 36A.

Various other modifications may be made in the methods and apparatus hereinbefore discussed without significantly departing from the essential concept of the present invention. Accordingly, it should be clearly understood that the structures and techniques which are described herein and depicted in the accompanying drawings are illustrative only and are not intended as limits on the scope of the invention.

What is claimed is:

1. A system for observing earth formation properties comprising:
   means for irradiating the earth formation with a pulse of high energy neutrons;
   means for detecting over a broad energy band gamma radiation produced by the inelastic scattering of neutrons by nuclei of the formation elements during an interval of $10\mu$ seconds or less in the early part of said neutron pulse and for producing signals in response thereto; and
   circuit means for converting said inelastic gamma ray signals to an output signal functionally related to inelastic gamma rays over a selected, broad energy band to provide an indication of the hydrogenous matter content of the earth formations under observation.

2. A system according to claim 1, wherein said inelastic gamma radiation signal producing means comprises a radiation detector spaced several inches from said neutron irradiating means.

3. A system according to claim 1, wherein said output signal is an indication of formation porosity.

4. A method for observing earth formation properties comprising the steps of:
   irradiating an earth formation with pulses of high energy neutrons;
   detecting over a wide energy band the gamma radiation produced by inelastic scattering of said neutrons by nuclei of earth formation elements during the time interval commencing after the initiation of each neutron pulse and terminating before thermal neutron absorption gamma radiation becomes predominant and generating signals in response thereto; and
   converting said inelastic gamma radiation signals to an output signal functionally related to inelastic gamma rays over a selected, broad energy band to provide an indication of hydrogenous matter content of earth formations under observation.

5. A method according to claim 4 wherein the time interval during which said inelastic scattering gamma radiation as detected is early in each neutron pulse and is of a duration not greater than $10\mu$ seconds.

6. A system for observing earth formation properties comprising:
   means for irradiating the earth formation with a pulse of high energy neutrons;
   means for detecting over a broad energy band gamma radiation produced by the inelastic scattering of said neutrons by nuclei of the formation elements during an interval of $10\mu$ sec or less in the early part of said neutron pulse and for producing signals in response thereto; and
   circuit means responsive to detector signals produced by inelastic gamma rays over a selected, broad energy band, for providing an output signal indicative of a characteristic of the formation under observation.

7. A system according to claim 6 wherein said inelastic gamma radiation signal producing means comprises a radiation detector spaced from said neutron irradiating means.

8. A method for observing earth formation properties comprising the steps of:
   irradiating an earth formation with pulses of high energy neutrons;
   detecting over a wide energy band the gamma radiation produced by the inelastic scattering of said neutrons by nuclei of the earth formation elements during the time interval commencing after the initiation of each neutron pulse and terminating before thermal neutron absorption gamma radiation becomes predominant and generating signals in response thereto; and
   providing an output signal indicative of a characteristic of the formation under observation responsive to detector signals produced by gamma rays over a selected, broad energy band.

9. The method of claim 8 wherein said selected, broad energy band is at least 3 M.E.V. in width.

10. The method of claim 8 wherein said selected, broad energy band includes a carbon energy band at least 1.5 M.E.V. in width and an oxygen energy band at least 1.5 M.E.V. in width.

11. The method of claim 10 wherein said output signal is functionally related to the ratio of carbon to oxygen in the formation.

12. The method of claim 8 further comprising the steps of:
   deriving from said gamma radiation signals, a first indicating signal functionally related to carbon in the formation as indicated by carbon gamma rays between 3 and 4.7 M.E.V.;
   deriving from said gamma radiation signals, a second indicating signal functionally related to oxygen in the formation as indicated by oxygen gamma rays between 5 and 6.5 M.E.V.; and
   deriving as said output signal a ratio of said first and second indicating signals.

13. The method described in claim 8, wherein said output signal is functionally related to the porosity of said formation.

14. The method described in claim 8, wherein said output signal is functionally related to the lithology of said formation.

15. The method of claim 8, wherein said output signal is functionally related to hydrocarbons in said formation.

16. The method described in claim 8, including the steps of:
   deriving from said detected gamma radiation a first indicating signal functionally related to said detected inelastic scattering gamma rays;
   deriving from said first indicating signal a second indicating signal functionally related to a first element in said formation;
   deriving from said first indicating signal a third indicating signal functionally related to a second element in said formation; and
   deriving from said second and third indicating signals a functional representation of said characteristic of said formation.

17. The method described in claim 16, further including:
   deriving and recording a ratio of said second and third indicating signals as a functional representation of said characteristic of said formation.

18. The method described in claim 17, further including:
   deriving said second indicating signal as a functional indication of carbon in said formation;
   deriving said third indicating signal as a functional indication of oxygen in said formation; and
   deriving and recording a ratio of said second and third indicating signals as a functional representation of the hydrocarbon content of said formation.

19. The method described in claim 8, including the steps of:
   deriving from said detected gamma radiation a first indicating signal functionally related to said detected inelastic scattering gamma rays;
   deriving from said first indicating signal a second indicating signal functionally related to a first element in said formation;
   deriving from said first indicating signal a third indicating signal functionally related to a second element in said formation; and
   deriving and recording a ratio of said second and third indicating signals as a functional representation of a formation characteristic.

20. The method described in claim 19, including the steps of:
   deriving from said first indicating signal a fourth indicating signal functionally related to a third element in said formation; and
   deriving from said first indicating signal a fifth indicating signal functionally related to a fourth element in said formation.

21. The method described in claim 20, further including:
   deriving and recording the sum of said second, third, fourth and fifth indicating signals as a functional representation of the porosity of said formation.

22. The method described in claim 20, including the step of:
   deriving and recording a ratio of said fourth and fifth indicating signals as a functional representation of another formation characteristic.

23. The method described in claim 22, further comprising:
   deriving said second indicating signal as a functional indication of carbon in said formation;
   deriving said third indicating signal as a functional indication of oxygen in said formation; and
   deriving and recording a ratio of said second and third indicating signals as a functional representation of the hydrocarbon content of said formation.

24. The method described in claim 23, further comprising:
   deriving said fourth indicating signal as a functional indication of calcium in said formation;
   deriving said fifth indicating signal as a functional indication of silicon in said formation; and
   deriving and recording a ratio of said fourth and fifth indicating signals as a functional representation of the lithology of said formation.

25. The method described in claim 24, further comprising:
   deriving said second indicating signal as a functional indication of carbon in said formation;
   deriving said third indicating signal as a functional indication of oxygen in said formation;

deriving a ratio of said second and third indicating signals; and deriving and recording a representation of the hydrocarbon content of said formation as a function of said ratio of said second and third indicating signals and said ratio of said fourth and fifth indicating signals.

26. The method described in claim 25, further including:

deriving a functional representation of the porosity of said formation; and deriving and recording a representation of the hydrocarbon saturation of said formation as a function of said hydrocarbon content and the porosity of said formation.

27. The method described in claim 8, including the steps of:

deriving a ratio of carbon to oxygen in said formation as a function of said output signal generated in response to said detected gamma rays produced by inelastic scattering of said neutrons; and deriving and recording a representation of the hydrocarbon content of said formation as a function of said ratio and the lithology of said formation.

28. The method described in claim 27, including the steps of:

deriving a functional representation of the porosity of said formation; and deriving and recording a representation of the hydrocarbon saturation of said formation as a function of said representations of the porosity and hydrocarbon content of said formation.

29. A system for observing earth formation properties comprising:

means for irradiating the earth formation with a pulse of high energy neutrons;

means for detecting gamma radiation produced by the inelastic scattering of said neutrons by nuclei in the earth formation during the time interval commencing after the initiation of each neutron pulse and terminating before thermal neutron absorption gamma radiation becomes predominant and generating a signal in response thereto;

circuit means for deriving from said inelastic gamma radiation signal, a first indicating signal functionally related to carbon in the formation as indicated by gamma radiation detected over an energy band including 3 to 4.7 M.E.V.;

circuit means for deriving from said inelastic gamma radiation signal, a second indicating signal functionally related to oxygen in the formation as indicated by gamma radiation detected over an energy band including 5 to 6.5 M.E.V.; and circuit means for deriving as an output signal a ratio of said first and second indicating signals as an indication of a characteristic of the formation under observation.

30. The system of claim 29 wherein said first and second indicating signals are compensated for inelastic background gamma radiation.

31. A method for observing earth formation properties comprising the steps of:

(a) irradiating an earth formation with pulses of high energy neutrons;

(b) detecting over a wide energy band the gamma radiation produced by the inelastic scattering of said neutrons by nuclei of the earth formation elements during the time interval commencing after the initiation of each neutron pulse and terminating before thermal neutron absorption gamma radiation becomes predominant and generating signals in response thereto;

(c) detecting the gamma radiation produced by thermal neutron absorption by nuclei of the earth formation elements during another time interval during which said thermal neutron absorption gamma radiation predominates over said gamma radiation produced by the inelastic scattering of said neutrons and generating signals in response thereto;

(d) providing an output signal indicative of a characteristic of the formation under observation responsive to detector signals produced by gamma rays over a selected, broad energy band by converting detector signals generated in response to said gamma radiation produced by inelastic scattering to a signal functionally related to the ratio of carbon to oxygen in the formation; and (e) providing another output signal indicative of a characteristic of the formation under observation by converting detector signals generated in response to said gamma radiation produced by thermal neutron capture to a signal functionally related to the ratio of silicon to calcium in the formation.

* * * * *

UNITED STATES PATENT AND TRADEMARK OFFICE
CERTIFICATE OF CORRECTION

PATENT NO. : 4,381,449
DATED : April 26, 1983
INVENTOR(S) : HARRY DAVIS SMITH, JR.

It is certified that error appears in the above—identified patent and that said Letters Patent is hereby corrected as shown below:

Column 20, delete lines 65-68

Column 21, delete lines 1 and 2

*Signed and Sealed this*

*Second* Day of *October 1984*

[SEAL]

*Attest:*

*Attesting Officer*

GERALD J. MOSSINGHOFF

*Commissioner of Patents and Trademarks*